United States Patent [19]

Heenan

[11] 3,923,378

[45] Dec. 2, 1975

[54] CUBE-CORNER REFLECTOR WITH NON-ALIGNED CUBE AXES AND ELEMENT AXES

[75] Inventor: Sidney A. Heenan, Park Ridge, Ill.

[73] Assignee: Amerace Corporation, New York, N.Y.

[22] Filed: Apr. 24, 1973

[21] Appl. No.: 354,153

[52] U.S. Cl................................ 350/103; 350/102
[51] Int. Cl.².......................................... G02B 5/12
[58] Field of Search............................ 350/97–109; 116/63; 404/9–16

[56] References Cited
UNITED STATES PATENTS

| | | | |
|---|---|---|---|
| 1,813,874 | 7/1931 | Eskilson | 350/102 |
| 2,055,298 | 9/1936 | Leray | 350/103 |
| 3,258,840 | 7/1966 | Hedgewick | 350/103 |
| 3,365,790 | 1/1968 | Brauer | 350/102 |
| 3,458,245 | 7/1969 | Stanley | 350/103 |
| 3,469,898 | 9/1969 | Altman | 350/103 |
| 3,541,606 | 11/1970 | Heenan et al. | 350/103 |
| 3,744,117 | 7/1973 | Heenan | 350/103 |

*Primary Examiner*—Alfred E. Smith
*Assistant Examiner*—Michael J. Tokar
*Attorney, Agent, or Firm*—Prangley, Dithmar, Vogel, Sandler & Stotland

[57] ABSTRACT

The reflector is constructed of transparent material and has a plurality of cube-corner reflector elements at the rear and a light-receiving face at the front. Each of the reflector elements has an element axis and a cube axis with an angle other than 0° therebetween. Each of the reflector elements has an outline in the shape of a regular polygon when projected in a plane perpendicular to the element axis. The faces of each element are symmetrically arranged with respect to the cube axis. The element axes of the reflector elements are all parallel to one another.

34 Claims, 38 Drawing Figures

CUBE-CORNER REFLECTOR WITH NON-ALIGNED CUBE AXES AND ELEMENT AXES

BACKGROUND OF THE INVENTION

U.S. Pat. No. 3,541,606, issued to S. A. Heenan and R. I. Nagel, discloses a reflector in which the cube corners of the reflector elements thereof are arranged in two or more groups, the elements of one group having aligned cube-corner and element axes inclined at one angle and the elements of the other group having aligned cube-corner and element axes inclined at another angle. Because of the dual-angle configuration, the reflector is visible over a greater zone than would a reflector having all elements similarly directed.

In a cube-corner reflector, the angle between the cube axis and each face of each cube-corner reflector element is nominally 35°16′, and the angle between the cube axis and each edge of each reflector element is nominally 54°44′. In a nonangled reflector, in which the cube axes of all the reflector elements are parallel (and perpendicular to the front face of the reflector if it is flat), the angle between all of the cube-corner faces and the front face of the reflector is nominally 54°44′, and the angle between the cube-corner edges and the front face is nominally 35°16′. In the angled reflector disclosed in the above-mentioned patent, the cube axes of all the reflector elements are not all parallel, but, rather are angled in different directions. Thus, one cube-corner face of some reflector elements is "more nearly parallel" to the front face of the reflector; and one cube-corner edge of the rest of the elements is "more nearly parallel" to such front face. For example, if the angle of inclination were 10° the angle between one cube-corner face of one-half of the reflector elements and the front face would decrease to 44°44′, and such angle in respect to the rest of the elements would increase to 64°44′. In the latter elements, a cube-corner edge of each is more nearly parallel to the front face of the reflector.

It has been found desirable in certain situations, that one face of all of the cube-corner reflector elements be more nearly parallel to the front face of an angled reflector. While there has been a previous attempt at providing a reflector in which each reflector element has one face more nearly parallel to the front face of the reflector, such attempt has not been entirely satisfactory. In that reflector rows of cube-corner elements are diamond-shaped in outline. The elements in every other row are angled in one direction, and the reflector elements in the rest of the rows are angled in the other direction. Although each reflector element has a face which is more nearly parallel to the front face of the reflector, it has "shadowing" or "slippage" losses. Also, apparatus used in making such a reflector is cumbersome.

SUMMARY OF THE INVENTION

It is, therefore, an important object of the present invention to provide a reflector in which each cube-corner reflector element has a face more nearly parallel to the light-receiving front face of the reflector without losses introduced by shadowing or slippage.

Still another object is to provide a reflector having cube-corner elements in which the cube axes and element axes are not aligned.

In summary, there is provided a retrodirective reflector for reflecting light substantially back to the source thereof over a wide angle, the reflector comprising a body of transparent material having a light-receiving front face, and a plurality of retrodirective cube-corner reflector elements at the rear of the body, each of the reflector elements having an element axis and a cube axis, each of the reflector elements having an outline in the shape of a regular polygon when projected in a plane perpendicular to the element axis, the element axes respectively of the reflector elements being disposed substantially parallel to one another, each of the reflector elements having three mutually perpendicular faces symmetrically arranged with respect to the cube axis and respectively intersecting in three mutually perpendicular edges, the cube axes of at least some of the reflector elements being inclined with respect to the associated element axes at a predetermined angle.

BRIEF DESCRIPTION OF THE DRAWINGS

The invention, both as to organization and method of operation, together with further objects and advantages thereof, will best be understood by reference to the following specification taken in connection with the accompanying drawings, in which.

DESCRIPTION OF THE PREFERRED EMBODIMENTS

Figure 1:
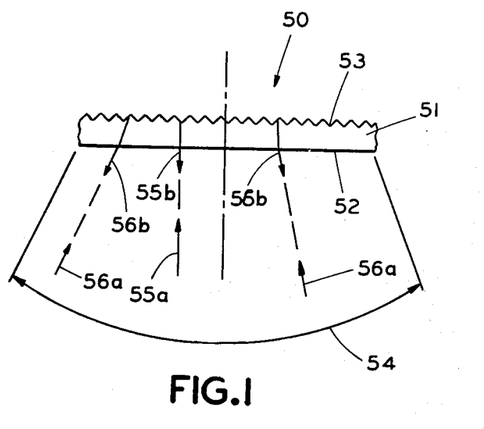
FIG. 1 is a schematic, fragmentary, top plan view of a reflector incorporating the features of the present invention.
Figure 2:
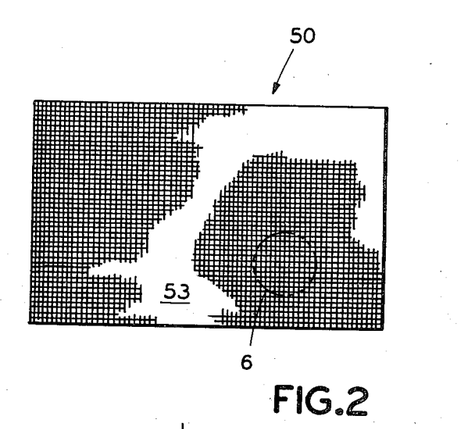
FIG. 2 is a rear elevational view, on a smaller scale, of the reflector of FIG. 1.

Turning now to the drawings, and more particularly FIGS. 1 and 2 thereof, there is shown a reflector 50 incorporating therein the features of the present invention. The reflector 50 comprises a body 51 of transparent material formed of a synthetic organic plastic resin, the preferred resin being methyl methacrylate. The body 51 has a smooth front face 52 which is also flat in the embodiment shown. The body 51 is also provided with a configurated rear 53 schematically shown in FIG. 2. The reflector 50 is so designed that it will be visible to a viewer who is within a combined zone of reflectorization 54, which is 52°, for example.

The "zone of reflectorization" is measured in a predetermined plane and means a zone throughout which the reflector will reflect at least a predetermined quantity of light to a viewer in response to a predetermined quantity of incident light from a light source, both the source of light and the viewer being within such zone. Thus, if a source of light and a viewer are both within the zone of reflectorization 54, the reflector 50 will return light rays from the source back to the viewer to cause the reflector 50 to be visible. If the light source and the viewer are without the zone of reflectorization 54, the reflector 50 will appear dark or not visible. The term "visible" means at least a predetermined quantity of light is reflected to the viewer. If the reflector is used on an automobile, for example, the reflector is designed so that it has the desired wide angle response in a "predetermined plane" which is horizontal. It is to be understood that the reflector will have a response for light rays at an angle to the predetermined plane. However, it is in such plane that it has the optimum response. Although the measurement of the zone of reflectorization is in a plane, such optimum response will occur in all planes parallel to such predetermined plane approximately within the height of the reflector.

The manner in which the reflector 50 operates is schematically shown in FIG. 1. An incoming ray 55a is derived from a source of light within the zone of reflectorization 54. Specifically, such ray 55a is at an angle of 0°, that is, it is directed substantially perpendicular to the front face 52 of the reflector 50. The incoming ray 55a is assumed to lie in the predetermined plane, and, because it strikes the front face 52 substantially normal thereto, it is not refracted. It strikes the configurated rear 53 which reflects the light to provide an outgoing ray 55b parallel to the incoming ray 55a. Although the rays 55a and 55b are shown to be aligned, it is to be understood that the properties of the reflector elements themselves cause a slight divergence between the rays 55a and 55b. Thus, the ray 55a will be returned retrodirectively by way of a ray of light 55b to an observer located substantially at the light source. Rays 56a are also in the predetermined plane, but are directed at an angle with respect to the flat front face 52 of the reflector 50. Thus, the rays 56a are refracted by such front face 52, are retrodirectively reflected by the configurated rear 53, again refracted by the front face 52 and emerge as outgoing rays 56b. The configurated rear 53 is designed to cause the outgoing rays 56b to be returned substantially to the observer who is located at the source of light. Thus, as long the source of light and the observer are within the zone of reflectorization 54, the outgoing rays 56b will be returned back to the observer, to cause the reflector to be visible.

Figure 3:
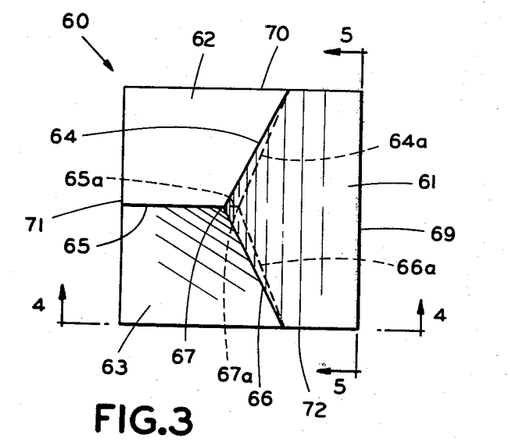
FIG. 3 is a greatly enlarged view of a square reflector element forming part of the reflector of FIGS. 1 and 2, taken in a plane perpendicular to the element axis of such elements.
Figure 4:
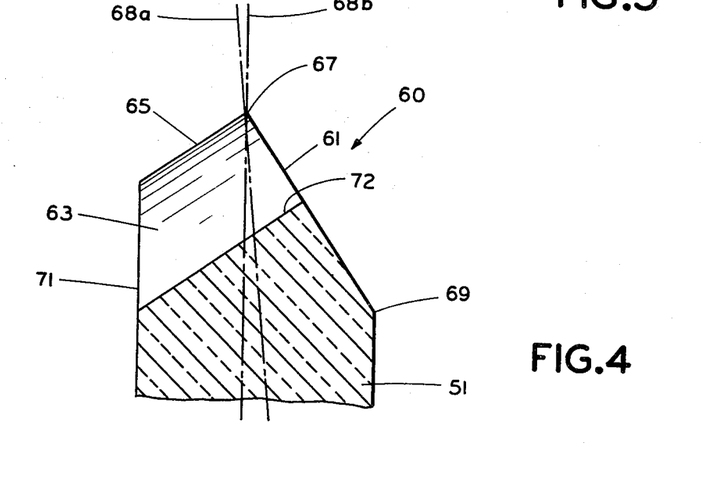
FIG. 4 is a view in cross section, taken along the line 4—4 of FIG. 3.
Figure 5:
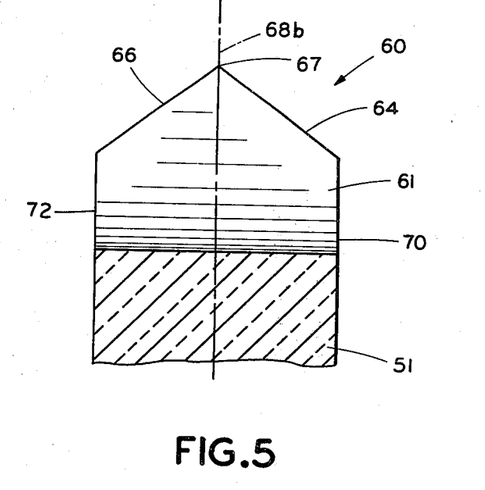
FIG. 5 is a view in cross section, taken along the line 5—5 of FIG. 3.

Reference is now made to FIGS. 3, 4 and 5, which illustrate the details of each of the reflector elements that make up the configurated rear 53 of the reflector 50. The reflector element is designated by the number 60 and includes three faces 61, 62, and 63 which intersect along edges 64, 65, and 66. The faces 61, 62, and 63 are inclined away from a common peak or apex 67. Each of the faces is substantially perpendicular to the other faces, that is, the face 61 is perpendicular to the faces 62 and 63; the face 63 is perpendicular to the faces 61 and 62, etc. The cube axis 68a is an imaginary line which passes through the apex 67, and, with respect to which axis, each of the faces 61, 62, and 63 is symmetrically arranged. In other words, the same angle is formed between the cube axis 68a and each of the faces 61, 62, and 63. Similarly, the cube axis 68a is symmetrically arranged with respect to the edges 64, 65, and 66, the angle between each of the edges and the cube axis 68a being the same.

Although the reflector element 60 is referred to as being of the "cube corner" type and the optical axis is referred to as a "cube" axis, it is to be understood that the term cube has reference to the fact that the three faces of the element are substantially perpendicular to each other, as are the three edges. The term does not suggest that the faces are congruent or equal in area. For example, one face can be larger than the other two faces.

Each reflector element 60 has one side 69 of the square boundary which is rectilinear and is contained by the face 61. Also, there is a plane normal to the cube axis 68 that contains the side 69, and therefore the side 69 is sometimes hereafter characterized as being "right angle, rectilinear". It should be noted that none of the other three sides of the square outline of the reflector element 60 is rectilinear. Specifically, the end of the edge 64 divides the upper (as viewed in FIG. 3) side 70 into shorter and longer side portions. The edge 65 intersects the left (as viewed in FIG. 3) side 71 at the center thereof. Finally, the edge 66 intersects the lower (as viewed in FIG. 3) side 72 to provide longer and shorter side portions. The faces 62 and 63 are mirror images of each other, but each has a different shape and area than the face 61. The faces 62 and 63 are symmetrical and symmetrically disposed on opposite sides of their intersection or edge 65, while the face 61 is symmetrical with respect to an extension of the edge 65.

The reflector element 60 also has an element axis 68b (FIG. 2), which, in FIG. 3, would be perpendicular to the plane of the paper. The reflector element 60 has a rectangular outline when projected in a plane perpendicular to the element axis 68b; the outline is square in the embodiment illustrated. Although the element axis 68b is shown to pass through the apex 67, it can intersect the element 60 at any point such as the geometric center of the outline. It should be noted that the cube axis 68a is not aligned with the element axis 68b. The angle between these two axes is in the range of about 6° to 13°; in the particular form illustrated the angle is 6°. This is in distinction to the usual reflector element wherein the cube axis and the element axis are aligned. The arrangement of the standard reflector element is depicted by the dotted lines in FIG. 3. The three mutually perpendicular edges are designated 64a, 65a, and 66a intersecting in an apex 67a. The apex 67a is located at the geometric center of the square outline depicted. With such an arrangement, the cube axis and the element axis are in alignment. In the modified form illustrated by the solid lines, the entire cube-corner formation has been tilted to the left, as viewed in FIG. 4, so as to cause the angle between the face 61 and the element axis 68b to increase from its nominal value of 35°16'. Such tilt is performed in a plane which contains the edge 65 and the cube axis 68a and the element axis 68b. It is in this predetermined plane that a wide angle response is desired. Assuming a 6° angle between the axes 68a and 68b, the angle between the face 61 and the element axis 68b increases to 41°16'. Of course, the edge 65 remains perpendicular to the face 61, so that the angle between the edge 65 and the element axis 68b decreases from its nominal value of 54°44' to 48°44', in the example described. It is to be noted that, despite the modification to the cube-corner formation, the side 69 continues to be right angle rectilinear.

Figures 6, 7:
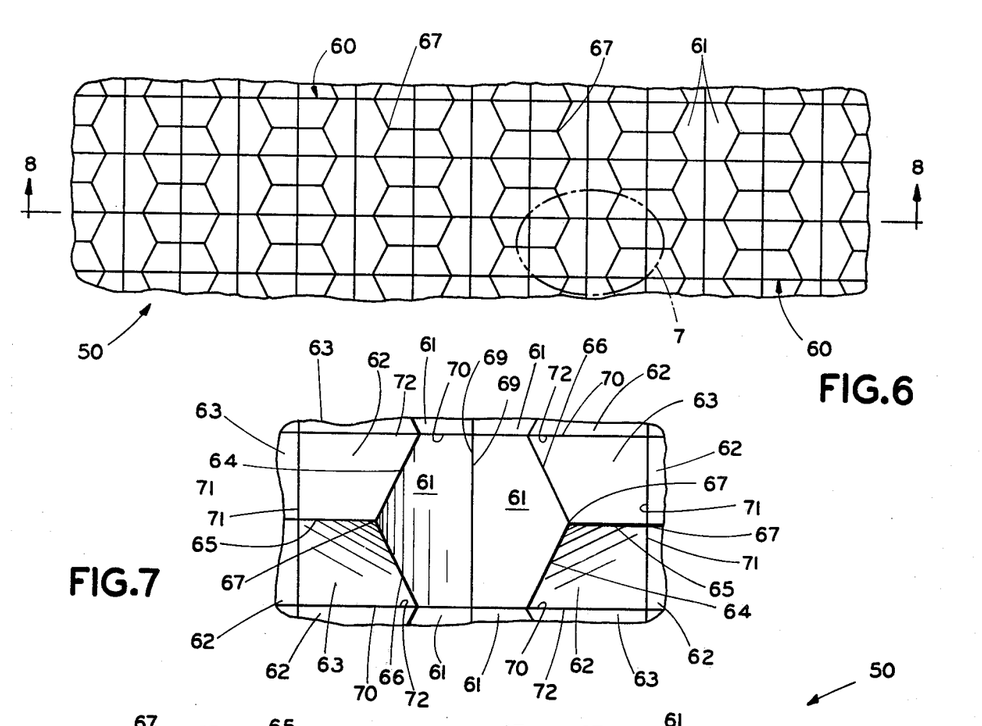
FIG. 6 is a fragmentary view, on an enlarged scale, of the portion of the rear surface of the reflector within the circle 6 of FIG. 2.
FIG. 7 is a fragmentary view, on an enlarged scale, of a portion of the rear surface of the reflector within the ellipse 7 of FIG. 6.
Figure 8:
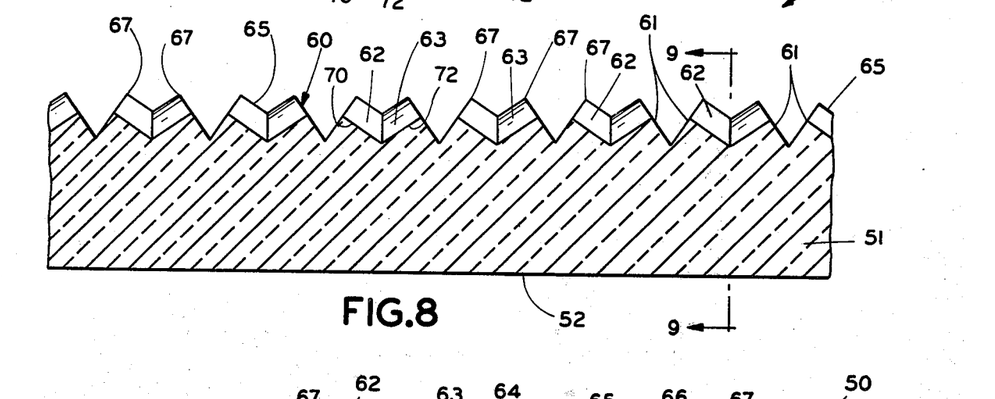
FIG. 8 is a view in section, taken along the line 8—8 of FIG. 6.
Figure 9:
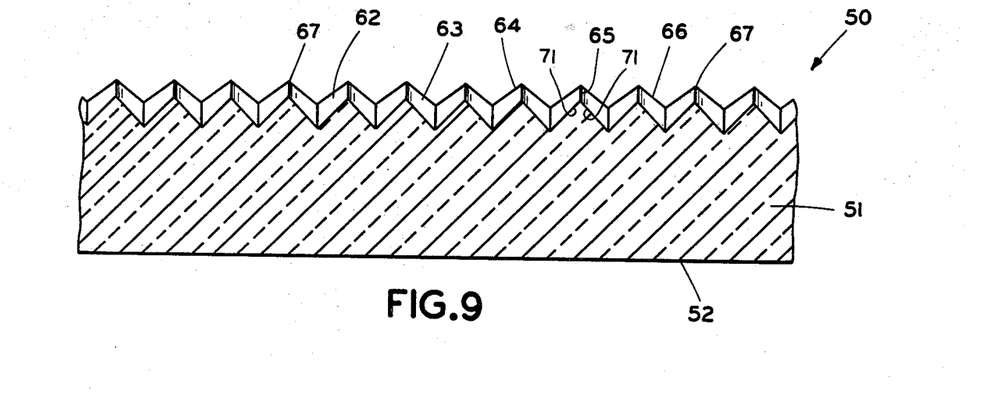
FIG. 9 is a view in section, taken along the line 9—9 of FIG. 8.

Turning now to FIGS. 6–9, further details of the reflector 50 will be described. The reflector elements 60 are arranged in alternating rows, each having a width of one reflector element. The faces 61 of the reflector elements 60 in every other row are directed to the right, and the faces 61 of the reflector elements 60 in the rest of the rows are directed to the left. FIG. 7 illustrates laterally adjacent reflector elements 60 in two adjacent rows. The two reflector elements 60 are arranged into a rectangular unit in which the length is twice as great as the width. The reflector elements 60 in the unit are contiguous and oriented 180° with respect to each other. The side 69 of one element 60 is in common with the side 69 of the adjacent element 60. Similarly, the side 71 of one element 60 is in common with the side 71 of the laterally adjacent element 60. The side 70 of one reflector element 60 is in common with the side 72 of the longitudinally adjacent element 60.

All of the element axes 68b in the reflector 50 are parallel to one another. Because laterally adjacent elements 60 are rotated 180° with respect to each other, the cube axes 68a of reflector elements 60 in one row are inclined to the left with respect to the associated element axis 68b, and the cube axes 68a of reflector elements 60 in laterally adjacent rows are directed to the right. In the example illustrated, the angle between the element axis 68b and the cube axis 68a is the same throughout the reflector 50, although this is not necessary. However, for the purpose of this application, the following convention will be adopted. An angle on one side of a line perpendicular to the front face 52 bears a plus sign, and an angle on the other side of that line bears a minus sign. In such cases, the angle between the cube axis 68a and the element axis 68b of the reflector elements 60 in one row bears a plus sign, and the corresponding angle in respect to reflector elements 60 in laterally adjacent rows bears a minus sign. Thus, while all of the element axes 68b are parallel, the cube axes 68a are at two different angles throughout the reflector 60.

Each row of reflector elements is bounded by a pair of parallel planes defined respectively by the sides 69 and 71. The side 69 of one reflector element 60 is a rectilinear continuation of the corresponding side 69 of the two longitudinally adjacent elements 60. The side 71 of each element 60 is a continuation of the corresponding sides 71 of the two longitudinally adjacent elements 60. Also the face 61 of each element 60 is a planar continuation of the faces 61 of the two longitudinally adjacent reflector elements 60. The boundaries of the reflector elements are defined by laterally extending parallel planes, and by longitudinally extending parallel planes which intersect the lateral planes, despite the fact that the angle of inclination of the cube axes 68a is not the same throughout the reflector 50. In the embodiment shown, the rows of reflector elements 60 alternate, so that in one row the cube axes 68a are directed to the left, and, in laterally adjacent rows, the cube axes 68a are directed to the right.

Each reflector element 60 is capable of reflecting light back toward the source thereof as long as such source is within a zone of reflectorization centered about the associated cube axis 68a of the element 60. Thus, those reflector elements with cube axes 68a directed to the left have a first zone of reflectorization defined by such cube axes, while the reflector elements with cube axes 68a directed to the right, will have a second zone reflectorization centered about the associated cube axes 68a.

The response curve of a cube-center reflector shows that the percentage of light returned, or efficiency, drops off very rapidly beyond entrance angles (angle between rays of incident light and cube axis) of approximately 17°. In such case, the zone of reflectorization is ±17°, centered about the cube axis 68a. Because of refraction at the front face 52, a 6° internal angle in plastic corresponds approximately to a 9° external angle in air. Using the example of a 6° angle between the cube axis 68a and the element axis 68b, the zone of reflectorization would be −26° to +8° for the reflector elements 60 having cube axes 68a directed to the left. For those reflector elements 60 having cube axes 68a directed to the right, the zone of reflectorization would extend from −8° to +26°. Thus, the combined zone of reflectorization in this example is ±26° with substantial overlap. As long as incoming rays are angles within such combined zone of reflectorization 54 (see FIG. 1) they will be returned to the source.

One feature of the present invention is the ability of the reflector 50 to appear uniformly lit when observed at any point within the combined zone of reflectorization. A generally-accepted rule of thumb is that the eye is unable to resolve an angle less than one minute, so that at 23 feet, areas spaced apart no more than 0.08 inches would appear unitary. In one form of the invention, each reflector element 60 has a side-to-side dimension of 0.04 inches, so that the width of a row is 0.04 inches. Thus, the eye would be unable to detect the spacing between the rows, as long as the observer was more than about 12 feet from the reflector 50. As long as the observer is more than 12 feet from the reflector, it will appear fully illuminated throughout its area to a viewer who is within the combined zone of reflectorization.

A particular advantage in the reflector described above is the absence of slippage and resultant shadowing between adjacent reflector elements 60. A slippage loss results when there is a discontinuity or axial displacement between adjacent reflector elements, with the result that a portion of one element is blocked by a portion of another element to rays at more than a predetermined inclination to the cube axes. All of the element axes 68b are parallel, and therefore each element 60 has a square outline in the same plane; i.e., the elements 60 are bounded by a set of laterally extending parallel planes intersecting a set of longitudinally extending parallel planes. Accordingly, there is no slippage between the reflecting elements. Although the reflector 50 is comprised of reflector elements having cube axes in two different directions, all the faces 61 have been arranged more nearly parallel to the front face 52.

In a wide angle reflector in which the cube axes of some reflector elements are inclined in one direction and the cube axes of other reflector elements are inclined in another direction, it is often desirable that all of the reflector elements have one face which is more parallel to the front face of the reflector. Examination of the response characteristics of cube corner reflector elements shows that, if the entrance angle formed by incident light in a plane containing the cube axis and one edge of the tube-corner formation increases, the percentage of reflected light decreases in such plane. Moreover, as the angle between a ray of incident light and such plane increases, there is a further decrease in the percentage of reflected light. However, the loss in specific intensity for light rays out of such plane is much less when the face is more nearly parallel to the front face of the reflector. It is desirable that the reflector have not only wide angle response in a given plane, it is also desirable that the response not deteriorate substantially for light rays out of such plane.

Figure 10:
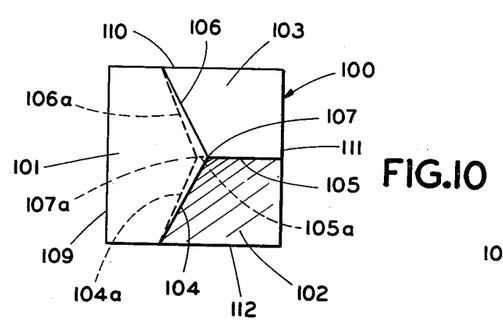
FIG. 10 is a greatly enlarged plan view of a square pin used in making the reflector of FIGS. 1–9, as projected in a plane perpendicular to the pin axis of such pin.
Figure 11:
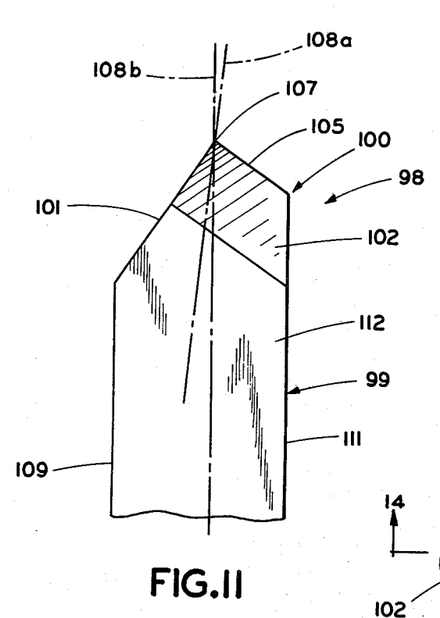
FIG. 11 is a side elevational view of the square pin viewed from beneath FIG. 10.
Figure 12:
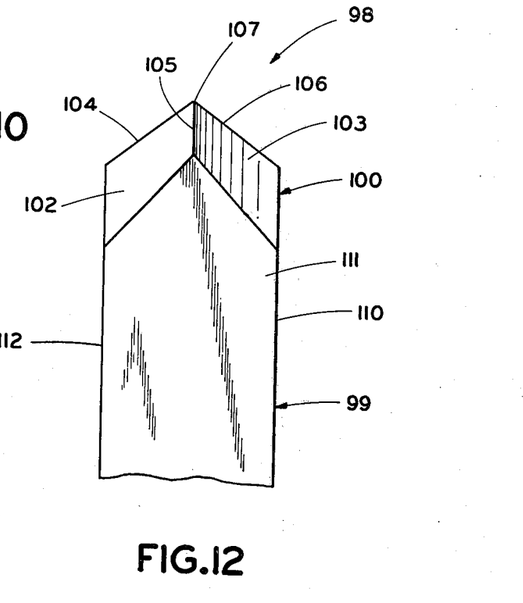
FIG. 12 is a side elevational view of the square pin, viewed from the right-hand side of FIG. 10.
Figure 14:
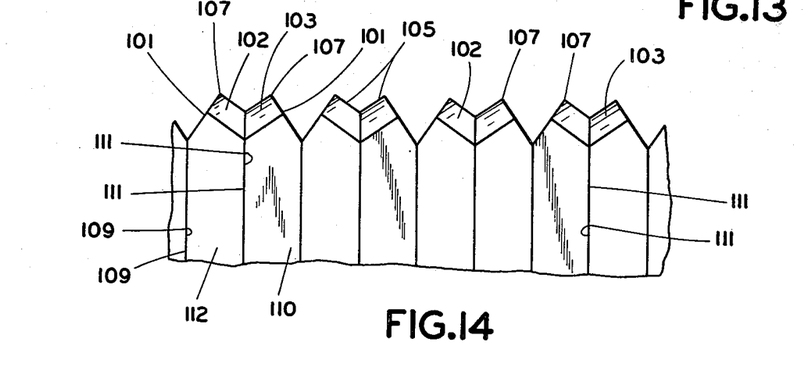
FIG. 14 is a view in cross section, taken along the line 14—14 of FIG. 13.

Turning now to FIGS. 10 and 14, the method of making the reflector shown in FIGS. 1 to 9 will be described. There is shown in FIGS. 10 to 12 a pin 98 (the pin 98 is shown very much enlarged and may have side-to-side dimension of 0.04 inches or less) having a square outline, which pin has an elongated shank 99 and a cube-corner formation 100 at one end thereof. The cube-corner formation 100 has three mutually-perpendicular faces 101, 102, and 103, adjacent pairs of faces respectively meeting at edges 104, 105, and 106. The faces 101, 102, and 103 are inclined away from a common peak or apex 107. Each of the faces is substantially perpendicular to the other faces, that is, the face 101 is perpendicular to the faces 102 and 103; the face 103 is perpendicular to the faces 101 and 102; etc. The pin 98 has one side 109 of the square boundary which is right angle, rectilinear and is contained by the face 101. It should be noted that none of the other three sides of the square outline of the pin 98 is rectilinear. Specifically, the end of the edge 104 divides the lower (as viewed in FIG. 10) side 112 into a shorter side portion and a longer side portion. The edge 105 intersects the right (as viewed in FIG. 10) side at the center thereof to provide equal side portions. Finally, the edge 106 intersects the upper (as viewed in FIG. 10) side to provide a longer side portion and a shorter side portion. The faces 102 and 103 are mirror images of each other, but each has a different shape and area than the face 101. The faces 102 and 103 are symmetrical and symmetrically disposed on opposite sides of their intersection or edge 105, while the face 101 is symmetrical with respect to an extension of the edge 105.

The pin 98 has a cube axis which is an imaginary line passing through the apex 107 and with respect to which each of the faces 101, 102, and 103 are symmetrically arranged. In other words, the same angle 34°16' is formed between the cube axis 108a and each of the faces 101, 102, and 103. Similarly the cube axis 108a is symmetrically arranged with respect to the edges 104, 105, and 106, the angle between each of the edges and the cube axes 108a being the same.

The pin 98 also has a pin axis 108b which, in FIG. 10, is perpendicular to the plane of the paper. Thus, the pin 98 and the cube-corner formation 100 have a square outline when projected in a plane perpendicular to the element axis 108b. It should be noted that the cube 108a is not aligned with the pin axis 108b. In the particular form illustrated, there is an angle of 6° between these two axes. This is in distinction to the usual pin wherein the cube axis and the pin axis are aligned. The arrangement of the standard pin is depicted by the dotted lines in FIG. 10. The three mutually perpendicular edges are respectively designated 104a, 105a, and 106a intersecting in an apex 107a. The apex 107a is located at the geometric center of the square outline depicted. With such an arrangement, the cube axis and the pin axis would be in alignment. In the modified form illustrated by the solid lines, the entire cube-corner formation 100 has been tilted to the right, as viewed in FIG. 10, so as to cause the angle between the face 101 and the axis 108a to increase from its nominal value of 35°16′. Assuming a 6° angle between the axes 108a and 108b, the angle between the face 101 and the pin axis 108b would increase to 41°16′. Of the course the edge 105 remains perpendicular to the face 101 so that the nominal value of the angle between the edge 105 and the pin axis 108b decreases from its nominal value of 54°44′ to 48°44′, in the example described. It is to be noted that despite the modification to the cube-corner formation 100, the side 69 continues to be right angle rectilinear.

Thus, the cube-corner formation 100 at the end of the pin 98 is identical to the reflector element 60 illustrated in FIGS. 3 to 5. Also the relationship of the pin 98 to its axes 108a and 108b is the same as the relationship between the element 60 and its axes 68a and 68b.

Figure 13:
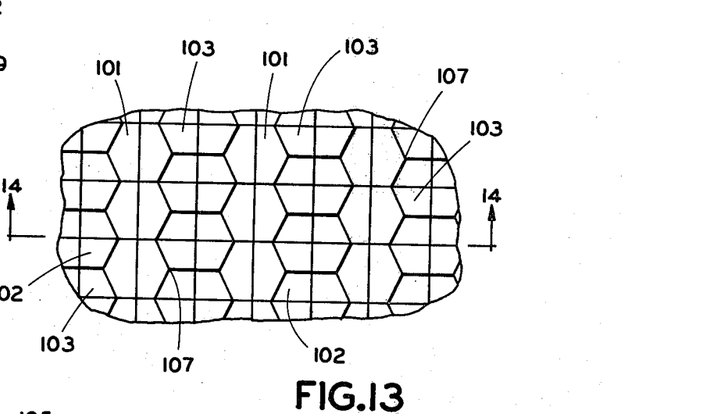
FIG. 13 is a fragmentary, plan view of a portion of a pin bundle using a plurality of the pins of FIGS. 10–12.

A number of the pins 98 are arranged into a pin bundle as illustrated in FIGS. 13 and 14. In plan view, the pin bundle has the same appearance as the rear of the reflector illustrated in FIG. 6. The longitudinally extending pin axes 108b of the pins 98 are parallel to each other so that the flat sides of each pin can respectively abut against the flat sides of adjacent pins. Accordingly, the pin bundle will have the same compact arrangement achieved with non-angled pins, despite the fact that the cube-corner formations 100 are skewed. In the interest of brevity, the details of the manner in which the pins 98 are assembled into the pin bundle will not be described further, except to point out that the parts of the pin bundle correspond to the reflector 50 and similar reference numerals having been applied; for example, the element axis is marked 68b and the corresponding pin axis is marked 108b.

The pin bundle is placed in a plating tank in which nickel or the like is deposited or electroformed onto the faces 101, 102, and 103 of the pins 98. After a period of time, a sufficient thickness of material has been electroformed onto the faces to render the electroform self-supporting. At that time, it is pried off the pins 98, and the electroform that is separated therefrom is further processed, and after being cut and otherwise treated, becomes a mold part. Of course, the steps of electroforming are known in the art, whereby the above description is a sketchy one, simply to describe the over-all process. It is to be understood that there may be a great may steps in the process of forming the pins into the desired array, all the way up to obtaining an electroform for use as a mold. The electroform may be used in an injection molding process to furnish the reflector of FIGS. 1 to 9.

Turning now to FIGS. 15 to 26 of the drawings, a second embodiment of the present invention will be described. The reflector illustrated in FIGS. 1 to 9 responded to light rays in a combined zone of reflectorization in a plane parallel to planes containing the edges 65 of the reflector elements 60. The instant embodiment has a zone of reflectorization in two planes which may be perpendicular. The reflector elements have cube axes inclined at two different angles in each of two planes as opposed to the first embodiment in which the reflector elements 60 had cube axes at two different angles in a single plane.

The reflector incorporating the features of the second embodiment is designated generally 150 and has a construction generally similar to the reflector 50. The reflector 150 operates in the same manner to reflect light rays back to the source within predetermined zones of reflectorization which are defined by the various cube axes.

Figure 15:
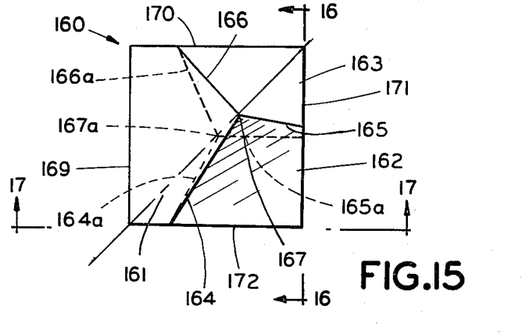
FIG. 15 s a greatly enlarged view of a square reflector element taken in a plane perpendicular to its element axis and forming part of a reflector comprising a second embodiment of the present invention.
Figure 16:
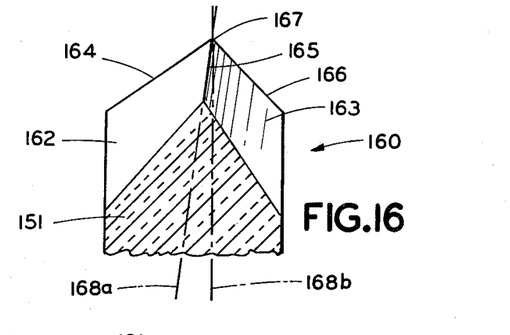
FIG. 16 is a view in cross section, taken along the line 16—16 of FIG. 15.

The reflector 150 comprises a plurality of reflector elements 160, each including three faces 161, 162, and 163 which intersect along edges 164, 165, and 166. The faces 161, 162, and 163 are inclined away from a common peak or apex 167. Each of the faces is substantially perpendicular to the other faces, that is, the face 161 is perpendicular to the faces 162 and 163; the face 163 is perpendicular to the faces 161 and 162, etc. The cube axis 168a is an imaginary line which passes through the apex 167 and with respect to which axis each of the faces 161, 162, and 163 are symmetrically arranged. In other words, the same angle is formed between the cube axis 168a and each of the faces 161, 162, and 163. Similarly, the cube axis 168a is symmetrically arranged with respect to the edges 164, 165, and 166, the angle between each of the edges and the cube axis 168a being the same.

The reflector element 160 also has an element axis 168b which, in FIG. 15, is perpendicular to the plane of the paper. The reflector element 150 has a rectangular outline when projected in a plane perpendicular to the element axis 168b; the outline is square in the embodiment illustrated. It should be noted that the cube axis 168a is not aligned with the element axis 168b. The arrangement of a reflector element in which these axes are aligned is depicted by the dotted lines in FIG. 15. The three mutually perpendicular edges are designated 164a, 165a, and 166a, intersecting in an apex 167a. The apex 167a is located at the geometric center of the square outline depicted. Although not apparent from the drawings, the ends of the edges 166 and 166a do not intersect the side 170 at a common point; similarly the edges 164 and 164a do not intersect the side 172 at a common point.

In the modified form illustrated by the solid lines, the entire cube-corner formation has been tilted to the right and upwardly, as viewed in FIG. 15. In this second embodiment, such tilt is performed in a diagonal plane 175, which contains the cube axis 168a and the element axis 168b. It is in this predetermined plane that a wide angle response is attained. The angle between the cube axis 168a and the element axis 168b, measured in such predetermined plane, is preferably in the range of about 6° to 13°. In the particular form illustrated, such angle is 6°.

Each reflector element 160 has one side 169 of the square outline which is rectilinear, although no longer right angle, and is contained by the face 161. The end of the edge 164 divides the lower (as viewed in FIG. 15) side 172 into shorter and longer side portions; the edge 165 intersects the right side 171 to divide it into longer and shorter side portions; and the edge 166 intersects the upper side 170 to divide it into longer and shorter portions.

Figures 17, 18, 19:
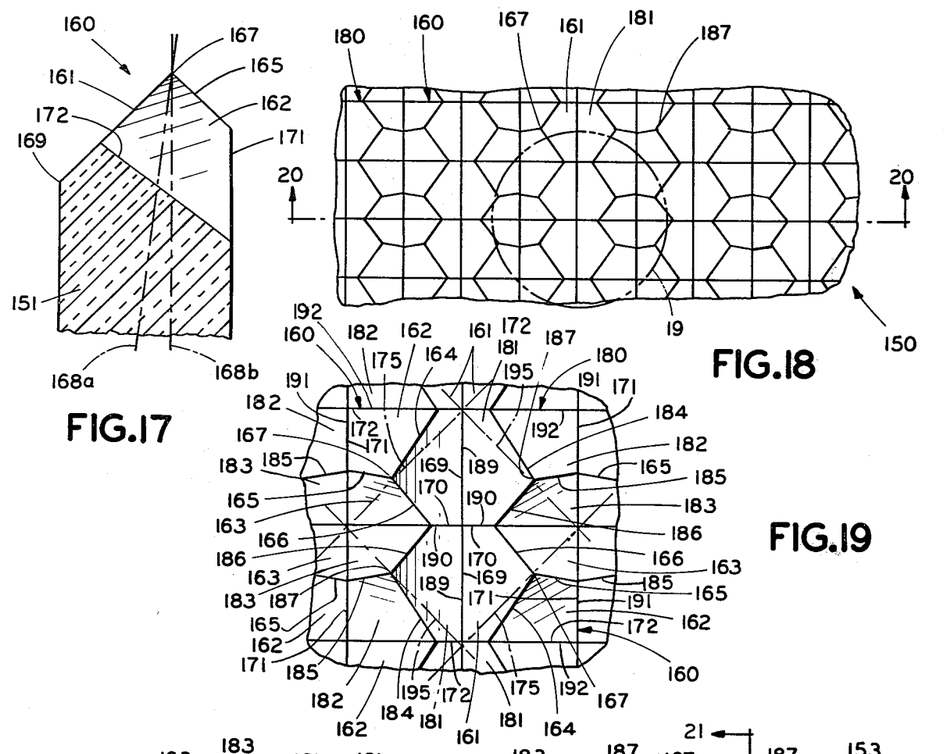
FIG. 17 is a view in cross section taken along the line 17—17 of FIG. 15.
FIG. 18 is a fragmentary view, on an enlarged scale, of a portion of the rear surface of a reflector incorporating the element shown in FIGS. 15 to 17.
FIG. 19 is a fragmentary view, on an enlarged scale, of one unit in the rear surface of the reflector within the circle 19 of FIG. 18.
Figure 20:
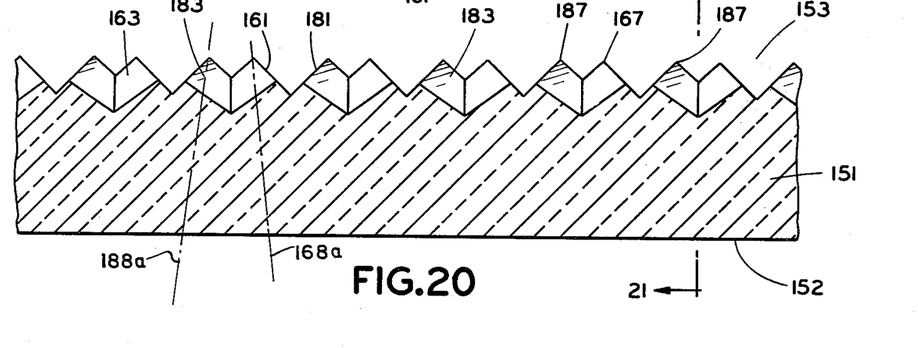
FIG. 20 is a view in section, taken along the line 20—20 of FIG. 18.
Figure 21:
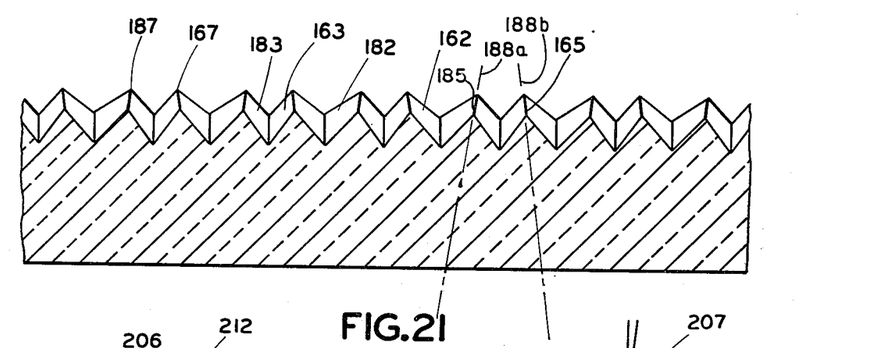
FIG. 21 is a view in section, taken along the line 21—21 of FIG. 20.

Turning now to FIGS. 18 to 20, further details of the reflector 150 will be described. The reflector elements are arranged into rectangular units, each having four elements situated in the four quadrants of a rectangle. The unit shown in FIG. 19 includes two reflector elements 160 and two additional elements 180 each of which differs from the element 160, in that they are mirror images of each other. It is to be understood, however, that the element 180 is in all other respects essentially identical to the element 160. For convenicne, the parts of the element 180 are identified by numbers which correspond to those used with respect to the corresponding parts of the element 160.

The cube axis 168a of the first reflector element 160 (in the upper left quadrant, as viewed in FIG. 19) lies in a diagonal plane 175 and is inclined downwardly and to the left, as viewed in FIG. 19. The cube axis 188a of the second reflector element 180 (upper right quadrant) lies in a diagonal plane 195 and is directed downwardly and to the right; the cube axis 168a of the third reflector element 160 (lower right quadrant) lies in a diagonal plane 175 and is directed upwardly and to the right; and the cube axis 188a of the fourth reflector element 180 (lower left quadrant) lies in a diagonal plane 195 and is directed upwardly and to the left. In all four elements, the associated cube axis is assumed to extend in the specified direction from behind FIG. 19; i.e., from the front face 152 to the rear surface 153.

The first reflector element 160 is the mirror image of the second reflector element 180, and the third reflector element 160 is the mirror image of the fourth reflector element 180. The edge 165 of one reflector element 160 and the edge 185 of a laterally adjacent reflector element 180 lie in a common plane. In the form illustrated, the angle of the cube axis of the third element 160 is substantially equal to the angle of the first element 160, but is opposite in sign; similarly, the angle of the cube axis of the fourth element 180 is substantially equal to the angle of the second element 180, but is opposite in sign. All of the element axes of the elements 160 and 180 are parallel throughout the reflector 150.

The sides 170 of the reflector elements 160 are respectively in common with the sides 190 of the longitudinally adjacent reflector elements 180. The sides 169 of the reflector elements 160 are respectively in common with the sides 189 of the laterally adjacent elements. Thus, each mating pair of sides within the unit is substantially identical, so that each juncture is substantially perfect.

Each lateral side of the unit, as outlined in FIG. 19, is defined by the sides 171 and 191 respectively of the reflector elements 160 and 180. The sides 171 and 191 of the reflector elements 160 and 180 in one unit respectively mate with the sides 191 and 171 of the reflector elements 180 and 160 of laterally adjacent units. Each longitudinal side of the unit is defined by the sides 172 and 192 respectively of the reflector elements 160 and 180. The sides 172 and 192 of the reflector elements 160 and 180 in one unit respectively mate with the sides 192 and 172 of the reflector elements 180 and 160 in longitudinally adjacent units. Each mating pair of adjoining units is identical, so that each juncture is substantially perfect; i.e., no axial displacement of one element with respect to an adjacent element. Each unit is bounded by one set of two parallel planes defined by the sides 172 and 192 and by another set of two parallel planes defined by the sides 171 and 191. The faces 161 and 181 are planar continuations respectively of longitudinally adjacent faces 161 and 181.

Each reflector element is capable of reflecting light back toward the source thereof within a zone of reflectorization defined by the associated cube axis and in a predetermined plane containing the associated cube axis and element axis. In the first reflector element 160, for example, the zone of reflectorization is in the diagonal plane 175. Assuming the same exemplary values used in respect to the first embodiment, the reflector 150 has a zone of reflectorization of −26° to +8° in one of the planes 175, and −8° to +26° in the other one of the planes 175. The combined zone of reflectorization resulting from the individual zones of reflectorization in the two planes 175 is measured in a single plane parallel thereto and is equal to ±26°. Similarly, the reflector 150 has a zone of reflectorization of −26° to +8° in one of the planes 195, and −8° to +26° in the other one of the planes 195. The combined zone reflectorization resulting from the individual zones of reflectorization in the two planes 195 would be measured in a single plane parallel thereto and is equal to ±26°. Thus, it can be seen that the reflector 150 furnishes zones of reflectorization in two perpendicular planes. By a suitable modification of the inclination of the cube axes, the reflector 150 may have zones of reflectorization in two planes which are not perpendicular.

The units illustrated in FIG. 19 are interspersed throughout the reflector 150, so that it will appear fully illuminated throughout its area to a vehicle which is in the combined zones of reflectorization.

A particular advantage achieved by the reflector 150 is the absence of slippage and resultant shadowing between adjacent reflector elements 160 and 180, whether in a unit or between units. No slippage loss is present since there is no discontinuity or axial displacement between adjacent reflector elements. All of the element axes 168b and 188b are parallel, and, therefore, each element 160 and 180 has a square outline in the same plane. Accordingly, there is no slippage between the reflector elements.

Figure 22:
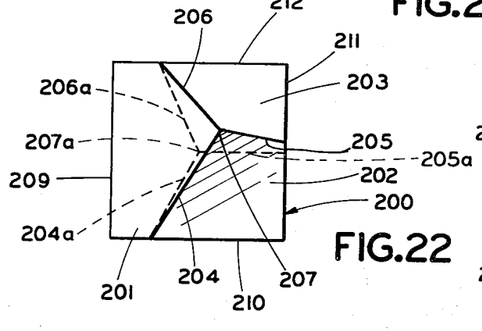
FIG. 22 is a greatly enlarged plan view of a square pin used in making the reflector of FIGS. 15–21, as projected in a plane perpendicular to the pin axis of such pin.
Figure 23:
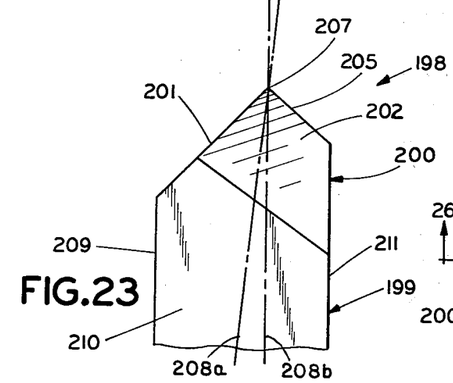
FIG. 23 is a side-elevational view of a square pin viewed from beneath FIG. 22.
Figure 24:
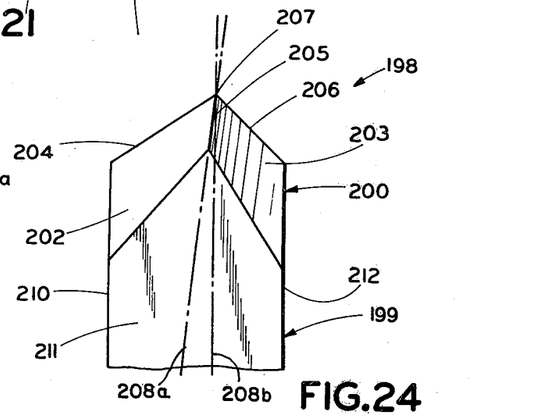
FIG. 24 is a side-elevational view of a square pin viewed from the right-hand side of FIG. 22.

Turning now to FIGS. 22 to 26, the method of making the reflector 150 shown in FIGS. 15 to 21 will be described. There is shown in FIG. 22 a pin 198 (the pin 198 is shown very much enlarged and may have side-to-side dimension of 0.04 inches or less) having a square outline, which pin has an elongated shank 199 and a cube-corner formation 200 at one end thereof. The cube-corner formation 200 has three mutually perpendicular faces 201, 202, and 203, adjacent pairs of faces respectively meeting at edges 204, 205, and 206. The faces 201, 202, and 203 are inclined away from a common peak or apex 207. Each of the faces is substantially perpendicular to the other faces, that is, the face 201 is perpendicular to the faces 202 and 203; the face 203 is perpendicular to the faces 201 and 202, etc. The pin 198 has one side 209 of the square outline which is rectilinear and is contained by the face 201. It should be noted that none of the other three sides of the square outline of the pin 198 is rectilinear. Specifically, the end of the edge 204 divides the lower (as viewed in FIG. 22) side 210 into a shorter side portion and a longer side portion. The edge 205 intersects the right side to divide it into longer and shorter side portions. Finally, the edge 206 intersects the upper side 212 to divide it into a longer side portion and a shorter side portion.

The pin 198 has a cube axis 208a which is an imaginary line passing through the apex 207 and with respect to which each of the faces 201, 202, and 203 are symmetrically arranged. In other words, the same angle 34°16' is formed between the cube axis 108a and each of the faces 201, 202, and 203. Similarly the cube axis 208a is symmetrically arranged with respect to the edges 204, 205, and 206, the angle between each of the edges and the cube axes 208a being the same.

The pin 198 also has a pin axis 208b which, in FIG. 22, is perpendicular to the plane of the paper. Thus, the pin 198 and the cube-corner formation 200 have a square outline when projected in a plane perpendicular to the pin axis 208b. It should be noted that the cube axis 208a is not aligned with the pin axis 208b. In the particular form illustrated, the angle between the cube axes 208a and the pin axis 208b in a diagonal plane of the square outline is about 6°. The arrangement of the standard pin is depicted by the dotted lines in FIG. 22. The three mutually perpendicular edges are respectively designated 204a, 205a, and 206a, intersecting in an apex 207a. The apex 207a is located at the geometric center of the square outline depicted. With such an arrangement, the cube axis and the pin axis would be in alignment. In the modified form illustrated by the solid lines, the entire cube-corner formation 200 has been tilted along the diagonal of the square outline. Thus, the cubecorner formation has the same characteristics as the reflector element 150. A second pin 218 has the same construction as the pin 198, except that one is the mirror image of the other. The relationship of the pins 198 and 218 to their respective cube and pin axes is the same as the relationship of the reflector elements 160 and 180 to their respective cube and element axes.

Figure 25:
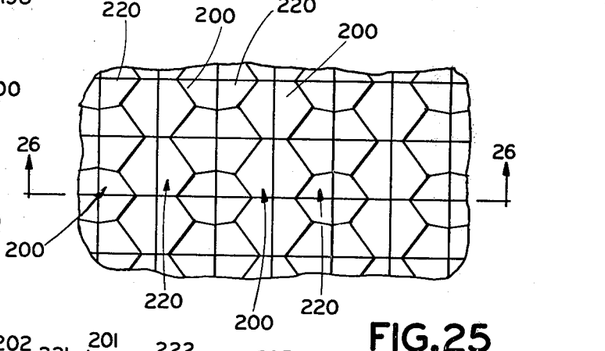
FIG. 25 is a fragmentary plan view of a portion of a pin bundle with a plurality of the pins of FIGS. 22–24.
Figure 26:
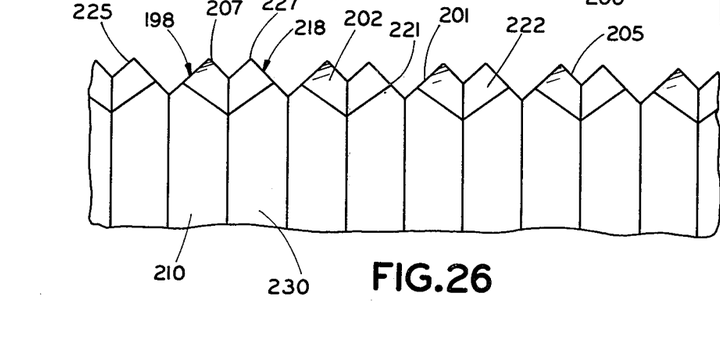
FIG. 26 is a view in cross section, taken along the line 26—26 of FIG. 25.

A number of the pins 98 and 208 are arranged into a pin bundle, as illustrated in FIGS. 25 and 26. In plan view, the pin bundle has the same appearance as the rear of the reflector 150 illustrated in FIG. 13. The longitudinally extending pin axes of the pins 198 and 218 are parallel to each other, so that the flat sides of each pin respectively abut against the flat sides of adjacent pins. Accordingly, the pin bundle will have the same compact arrangement achieved with nonangled pins, despite the fact that the cube-corner formations 200 and 220 are skewed. In the interest of brevity, the details of the manner in which the pins 198 and 218 are assembled into the pin bundle will not be described further, except to point out that the parts of the pin bundle correspond to the reflector 150 and similar reference numerals having been applied; for example, an element axis is marked 168b and the corresponding pin axis is marked 208b. The pin bundle is used to make a reflector in the same manner used in respect to the first embodiment.

Turning now to FIGS. 27 to 38 of the drawings, a third embodiment of the present invention will be described. The instant embodiment has a zone of reflectorization in each of two perpendicular planes, and the reflector elements have cube axes inclined at two different angles in each plane. The reflector incorporating the features of the second embodiment is designated generally 250. The reflector 250 operates in the same manner as the reflector 50 to reflect light rays back to the source within predetermined zones of reflectorization which are defined by the various cube axes.

The reflector 250 comprises a plurality of reflector elements 260, each including three faces 261, 262, and 263 which intersect along edges 264, 265, and 266.

The faces 261, 262, and 263 are inclined away from a common peak or apex 267. Each of the faces is substantially perpendicular to the other faces, that is, the face 261 is perpendicular to the faces 262 and 263; the face 263 is perpendicular to the faces 261 and 262; etc. The cube axis 268a is an imaginary line which passes through the apex 267 and with respect to which axis each of the faces 261, 262, and 263 are symmetrically arranged. In other words, the same angle is formed between the cube axis 268a and each of the faces 261, 262, and 263. Similarly, the cube axis 268a is symmetrically arranged with respect to the edges 264, 265, and 266, the angle between each of the edges and the cube axis 268a being the same.

Figures 27, 28, 30, 31, 32:
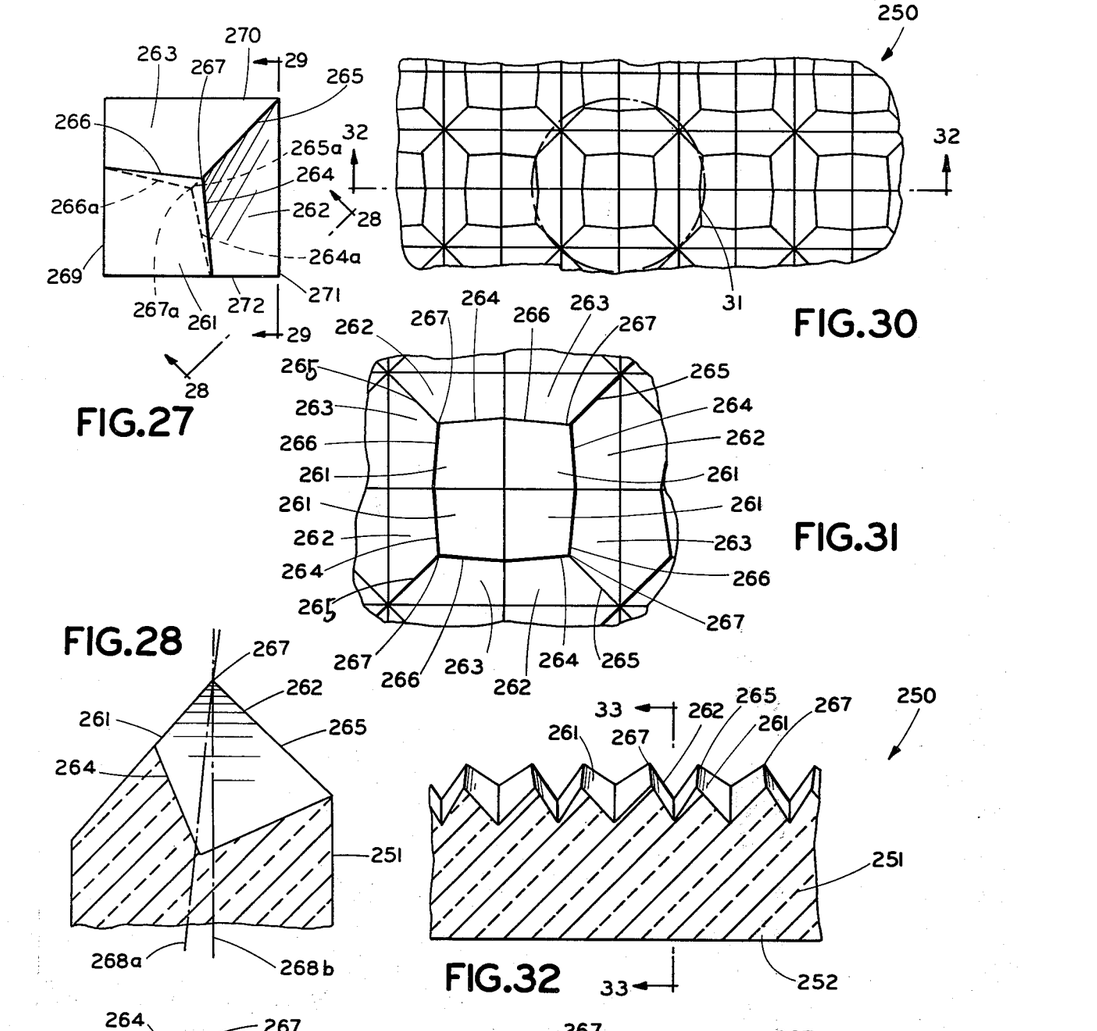
FIG. 27 is a greatly enlarged view of a square reflector element taken in a plane perpendicular to its element axis and forming part of a reflector comprising a third embodiment of the present invention.
FIG. 28 is a view in cross section, taken along the line 28—28 of FIG. 27.
FIG. 30 is a fragmentary view, on an enlarged scale, of a portion of the rear surface of a reflector incorporating the element shown in FIGS. 27 to 29.
FIG. 31 is a fragmentary view, on an enlarged scale, of one unit in the rear surface of the reflector within the circle 31 of FIG. 30.
FIG. 32 is a view section, taken along the line 32—32 of FIG. 30.
Figure 29:
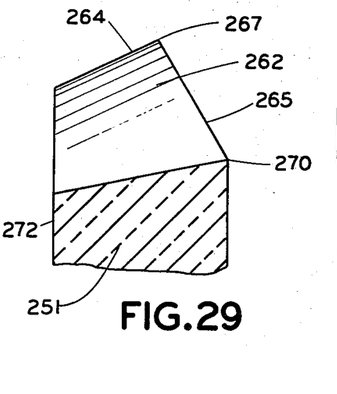
FIG. 29 is a view in cross section, taken along the line 29—29 of FIG. 27.
Figure 33:
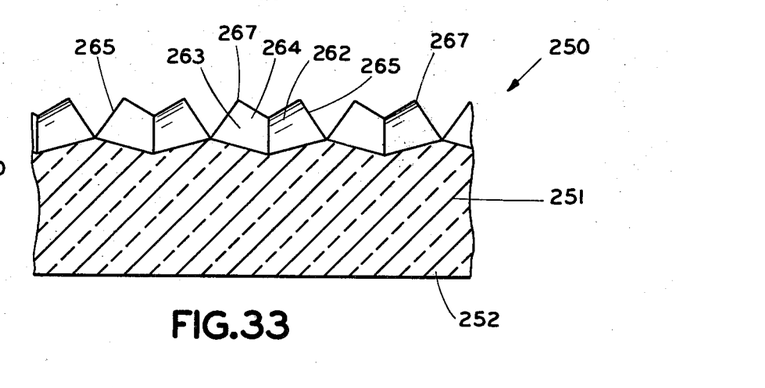
FIG. 33 is a view in section, taken along the line 33—33 of FIG. 32.

The reflector element 260 also has an element axis 268b, which in FIG. 27, is perpendicular to the plane of the paper. The reflector element 260 has a rectangular outline when projected in a plane perpendicular to the element axis 268b; the outline is square in the embodiment illustrated. It should be noted that the cube axis 268a is not aligned with the element axis 268b. The arrangement of a reflector element in which these axes are aligned is depicted by the dotted lines in FIG. 27. The three mutually perpendicular edges are designated 264a, 265a, and 266a, intersecting in an apex 267a. The apex 267a is located at the geometric center of the square outline depicted. With such an arrangement, the cube axis and the element axis are in alignment.

In the modified form illustrated by the solid lines, the entire cube-corner formation has been tilted to the right and upwardly, as viewed in FIG. 27. In this third embodiment, such tilt is performed in a diagonal plane, which contains the edge 265, the cube axis 268a, and the element axis 268b. It is in this predetermined plane that a wide angle response is attained. The angle between the cube axis 268a and the element axis 268b, measured in such predetermined plane is in the range of about 6° to 13°. In the particular form illustrated, such angle is 6°.

The reflector element 260 has two rectilinear sides 270 and 271, which sides and the edge 265 intersect in a common point. A third side 272 of the element 260 is divided by the end of the edge 264 into longer and shorter side portions. The remaining side 269 of the reflector element 260 is divided into shorter and longer side portions by virtue of the intersection of the edge 266 with such side.

The faces 262 and 263 are symmetrical and symmetrically disposed on opposite sides of the edge 265, while the face 261 is symmetrical about a plane passing through the edge 265 and the opposite corner of the element 260. The faces 262 and 263 are mirror images, and each has a different shape and area than the face 261.

Referring to FIG. 31, there is shown a unit consisting of four elements 260 each being rotated 90° with respect to the adjacent reflector element and disposed in the four quadrants of a square outline. Thus, a plane passing through the edges 265 of one pair of diagonally opposite reflector elements 260 is perpendicular to a plane passing through the edges 265 of another pair of diagonally opposite reflector elements 260. The four faces 261 meet at a common point which is the center of the unit.

All of the element axes 268b of the reflector elements 260 are parallel throughout the reflector 250. The sides 269 of the reflector elements 260 are respectively in common with the sides 272 of adjacent reflector elements 260. Each mating pair of sides within the unit is substantially identical, so that each juncture is substantially perfect (no axial displacement).

Each unit, as illustrated in FIG. 31, is bounded by one set of two parallel planes defined by the sides 270 and 271, and by another set of two parallel planes, also defined by the sides 270 and 271, which intersect the first two planes. Each mating pair of sides of adjoining units is identical, so that each juncture is substantially perfect (no axial displacement).

Each reflector element 260 is capable of reflecting light back toward the source thereof within a zone of reflectorization defined by the associated cube axis 268a and in a diagonal plane containing the cube axis 268a and the element axis 268b. Assuming the same exemplary values used in respect to the first and second embodiments, each reflector element 260 has a zone of reflectorization of −26° to +8° in each diagonal plane. The combined zone of reflectorization resulting from the individual zones of reflectorization of one pair of diagonally opposite reflector elements is measured in a first plane passing diagonally through the unit and is equal to ±26°. The combined zone of reflectorization resulting from the individual zones of reflectorization in the other pair of diagonally opposite reflector elements is measured in a second plane passing diagonally through the unit perpendicular to the first plane and is equal to ±26°. Thus, it can be seen that the reflector 250 furnishes zones of reflectorization in two perpendicular planes.

The units illustrated in FIG. 31 are interspersed throughout the reflector 250, so that it will appear fully illuminated throughout its area to a viewer in the combined zones of reflectorization.

A particular advantage achieved by the reflector 250 is the absence of slippage and resultant shadowing between adjacent reflector elements 260, whether in a unit or between units. No slippage loss is present since there is no discontinuity or axial displacement between adjacent reflector elements. All of the element axes 268b are parallel, and, therefore, each element 260 has a square outline in the same plane. Accordingly, there is no slippage between the reflector elements.

Figures 34, 35, 36, 37:
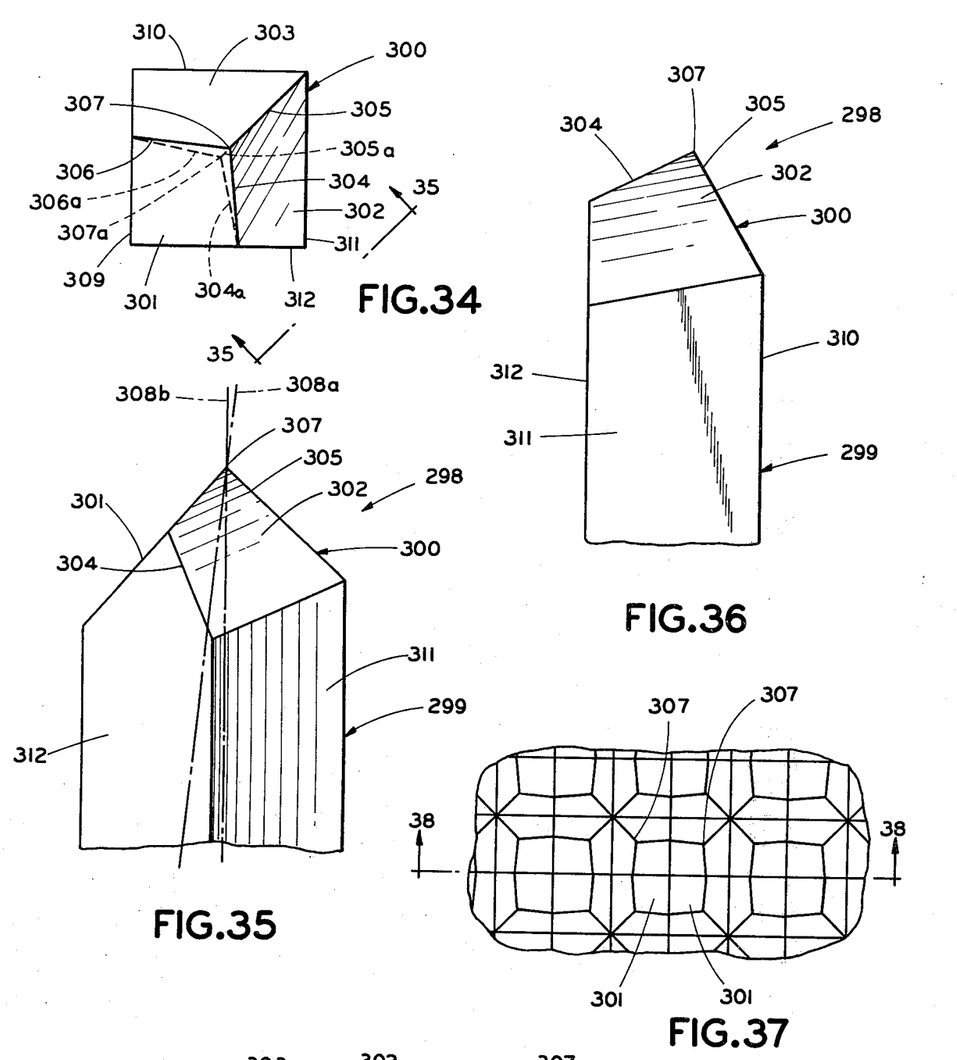
FIG. 34 is a greatly enlarged plan view of a square pin used in making the reflector of FIGS. 27 to 33, projected in a plane perpendicular to the pin axis of such pin.
FIG. 35 is an elevational view of a square pin, taken along the line 35—35 of FIG. 34.
FIG. 36 is a side-elevational view of the square pin, viewed from the right-hand side of FIG. 34.
FIG. 37 is a fragmentary plan view of a portion of a pin bundle with a plurality of the pins of FIGS. 34 to 36.

Turning now to FIGS. 34 to 38, the method of making the reflector shown in FIGS. 27 to 33 will be described. There is shown in FIG. 34 a pin 298 (the pin 298 is shown very much enlarged and may have side-to-side dimension of 0.04 inches or less) having a square outline, which pin has an elongated shank 299 and a cube-corner formation 300 at one end thereof. The cube-corner formation 300 has three mutually perpendicular faces 301, 302, and 303, adjacent pairs of faces respectively meeting at edges 304, 305, and 306. The faces 301, 302, and 303 are inclined away from a common peak or apex 307. Each of the faces is substantially perpendicular to the other faces, that is: the face 301 is perpendicular to the faces 302 and 303; the face 303 is perpendicular to the faces 301 and 302; etc. The pin 298 has two rectilinear sides 310 and 311, which sides and the edge 305 intersect in a common point. A third side 312 of the cube-corner formation 300 is divided by the end of the edge 304 into longer and shorter side portions. The remaining side 309 of the cube-corner formation 300 is divided into shorter and longer side portions by virtue of the intersection of the edge 306 with such side.

The faces 302 and 303 are symmetrical and symmetrically disposed on opposite sides of the edge 305, while the face 301 is symmetrical about a plane passing through the edge 305 and the opposite corner of the formation 300. The faces 302 and 303 are mirror images, and each has a different shape and area than the face 301.

The pin 298 has a cube axis 308a which is an imaginary line passing through the apex 307 and with respect to which each of the faces 301, 302, and 303 are symmetrically arranged. In other words, the same angle 34°16′ is formed between the cube axis 208a and each of the faces 301, 302, and 303. Similarly, the cube axis 308a is symmetrically arranged with respect to the edges 304, 305, and 306, the angle between each of the edges and the cube axes 308a being the same.

The pin 298 also has a pin axis 308b which, in FIG. 34, is perpendicular to the plane of the paper. Thus, the pin 298 and the cube-corner formation 300 have a square outline when projected in a plane perpendicular to the pin axis 308b. It should be noted that the cube axis 308a is not aligned with the pin axis 308b. In the particular form illustrated, there is an angle of 6° between these two axes in a diagonal plane containing the edge 305, the cube axis 308a, and the pin axis 308b. The arrangement of the standard pin is depicted by the dotted lines in FIG. 34. The three mutually perpendicular edges are respectively designated 304a, 305a, and 306a, intersecting in an apex 307a. The apex 307a is located at the geometric center of the square outline depicted. With such an arrangement, the cube axis and the pin axis would be in alignment. In the modified form illustrated by the solid lines, the entire cube-corner formation 300 has been tilted along the diagonal of the outline. Thus, the cube-corner formation has the same characteristics as the reflector element 260. The relationship of the pin 298 to its cube axis 308a and pin axis 308b is the same as the relationship of the reflector element 160 to its cube axis 168 a and element axis 168b.

Figure 38:
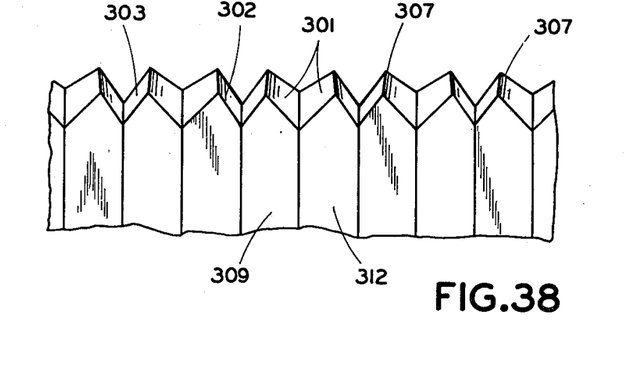
FIG. 38 is a view in cross section, taken along the line 38—38 of FIG. 37.

A number of the pins 298 are arranged into a pin bundle as illustrated in FIGS. 37 and 38. In plan view, the pin bundle has the same appearance as the rear of the reflector 250 illustrated in FIG. 30. The longitudinally extending pin axes of the pins 298 are parallel to each other, so that the flat sides of each pin respectively abut against the flat sides of adjacent pins. Accordingly, the pin bundle will have the same compact arrangement achieved with nonangled pins, despite the fact that the cube-corner formations 300 are skewed. In the interest of brevity, the details of the manner in which the pins 298 are assembled into the pin bundle will not be described further, except to point out that the parts of the pin bundle correspond to the reflector 250 and similar reference numerals having been applied; for example, and element axis is marked 268b and the corresponding pin axis is marked 308b. The pin bundle is used to make a reflector in the same manner used in respect to the first and second embodiments.

What has been described, therefore, are three embodiments of a side angle reflector which accepts light within a relatively broad zone. In the first embodiment, that zone is measured in one plane; in the second and third embodiments, two such zones are provided in two perpendicular planes, so as to accept light over a broad range of entrance angles. The latter two embodiments are also less susceptible to variation by virtue of change

17 in orientation (that is, rotated by an axis parallel to the element axes). An approved apparatus of making each of the three reflectors has also been described, which consists in providing a pin with its cube-corner formation tilted with respect to the pin axis.

It is believed that the invention, its mode of construction and assembly, and many of its advantages should be readily understood from the foregoing without further description, and it should also be manifest that, while preferred embodiments of the invention have been shown and described for illustrative purposes, the structural details are, nevertheless, capable of wide variation within the purview of the invention as defined in the appended claims.

What is claimed is:

1. A retrodirective reflector for reflecting light substantially back to the source thereof, said reflector comprising a body of transparent material having a light-receiving front face, and a plurality of retrodirective cube-corner reflector elements at the rear of said body, each of said reflector elements having an element axis and a cube axis, each of said reflector elements having an outline in the shape of a regular polygon when projected in a plane perpendicular to said element axis, each of said reflector elements having three mutually perpendicular faces symmetrically arranged with respect to said cube axis and respectively intersecting in three mutually perpendicular edges, the element axes respectively of all of said reflector elements being disposed substantially parallel to one another, the cube axes of at least some of said reflector elements being inclined with respect to the associated element axes at a predetermined angle other than zero degrees.

2. The retrodirective reflector set forth in claim 1, wherein all of said reflector elements are substantially identical.

3. The retrodirective reflector set forth in claim 1, wherein said front face is substantially flat and said element axes are substantially perpendicular to said front face.

4. The retrodirective reflector set forth in claim 1, wherein each of said reflector elements has a square outline when projected in a plane perpendicular to said element axis.

5. The retrodirective reflector set forth in claim 1, wherein said predetermined angle is in the range of about 6° to 13°.

6. The retrodirective reflector set forth in claim 1, wherein the angle between one of the faces of each of said reflector elements and said front face is less than about 54°.

7. A retrodirective reflector for reflecting light substantially back to the source thereof over a wide angle, said reflector comprising a body of transparent material having a light-receiving front face, and a plurality of retrodirective cube-corner reflector elements at the rear of said body, each of said reflector elements having an element axis and a cube axis, each of said reflector elements having a substantially rectangular outline when projected in a plane perpendicular to said element axis, each of said reflector elements having three mutually perpendicular faces symmetrically arranged with respect to said cube axis and respectively intersecting in three mutually perpendicular edges, the element axes respectively of all of said reflector elements being disposed substantially parallel to one another, the cube axes of a first group of said reflector elements being inclined with respect to the associated element axes at a first angle as measured in a predetermined plane, the cube axes of a second group of said reflector elements being inclined with respect to the associated element axes at a second different angle as measured in said predetermined plane, the reflector elements in said first and second groups being capable of reflecting light back toward the source thereof respectively within first and second zones of reflectorization in said predetermined plane and respectively defined by the associated cube axes, whereby said reflector is visible to a viewer within a combined zone of reflectorization defined by said first and second zones of reflectorization.

8. The retrodirective reflector set forth in claim 7, wherein the cube axes of the reflector elements in said first group are substantially parallel to one another, and the cube axes of the reflector elements in said second group are substantially parallel to one another.

9. The retrodirective reflector set forth in claim 7, wherein said first and second groups of said reflector elements are interspersed to enable said reflector to appear substantially illuminated throughout its area to a viewer in said combined zone of reflectorization.

10. The retrodirective reflector set forth in claim 7, wherein said second angle is substantially equal to said first angle but bears an opposite sign.

11. The retrodirective reflector set forth in claim 7, wherein the angle between one face of each of said reflector elements and said front face is less than about 54°.

12. A retrodirective reflector for reflecting light substantially back to the source thereof over a wide angle, said reflector comprising a body of transparent material having a light-receiving front face, and a plurality of retrodirective cube-corner reflector elements at the rear of said body, each of said reflector elements having an element axis and a cube axis, each of said reflector elements having a substantially rectangular outline when projected in a plane perpendicular to said element axis, each of said reflector elements having three mutually perpendicular faces symmetrically arranged with respect to said cube axis and respectively intersecting in three mutually perpendicular edges, each of said reflector elements having a given side which is rectilinear and is contained by one of said faces and lies in a plane perpendicular to said element axis, one edge of each of said reflector elements being substantially perpendicular to said one face and lying in a predetermined plane, the element axes respectively of all of said reflector elements being disposed substantially parallel to one another, said reflector elements being arranged in first and second rows, the cube axes of the reflector elements in said first rows being inclined with respect to the associated element axes at a first angle as measured in said predetermined plane, the cube axes of the reflector elements in said second rows being inclined with respect to the associated element axes at a second different angle as measured in said predetermined plane, the reflector elements in said first and second rows being capable of reflecting light back toward the source thereof respectively within first and second zones of reflectorization in said predetermined plane and respectively defined by the associated cube axes, whereby said reflector is visible to a viewer within a combined zone of reflectorization defined by said first and second zones of reflectorization.

13. The retrodirective reflector set forth in claim 12, wherein the angle between said one face of each of said reflector elements and said front face is less than about 54°.

14. The retrodirective reflector set forth in claim 12, wherein said first and second rows of reflector elements alternate to enable said reflector to appear substantially fully illuminated throughout its area to a viewer within said combined zone of reflectorization.

15. The retrodirective reflector set forth in claim 12, wherein all of said one edges are parallel.

16. The retrodirective reflector set forth in claim 12, wherein said second angle is substantially equal to said first angle but bears an opposite sign.

17. The retrodirective reflector set forth in claim 12, wherein the reflector elements in said first rows are mirror images of the reflector elements in said second rows.

18. A retrodirective reflector for reflecting light substantially back toward the source thereof over a wide angle, said reflector comprising a body of transparent material having a light-receiving front face, and a plurality of retrodirective cube-corner reflector elements at the rear of said body, each of said reflector elements having an element axis and a cube axis, each of said reflector elements having a substantially rectangular outline when projected in a plane perpendicular to said element axis, each of said reflector elements having three mutually perpendicular faces symmetrically arranged with respect to said cube axis and respectively intersecting in three mutually perpendicular edges, each of said reflector elements having a given side which is rectilinear and is contained by one of said faces and lies in a plane perpendicular to said element axis, one edge of each of said reflector elements being substantially perpendicular to said one face, the element axes respectively of all of said reflector elements being disposed substantially parallel to one another, said reflector elements being arranged into rectangular units each having first and second and third and fourth reflector elements respectively clockwise situated in the four quadrants of a rectangle, the cube axes of said first and second and third and fourth reflector elements being inclined with respect to the associated element axes respectively at first and second and third and fourth angles as measured respectively in first and second and third and fourth planes, said first and second and third and fourth reflector elements being capable of reflecting light back toward the source thereof respectively within first and second and third and fourth zones of reflectorization respectively in said first and second and third and fourth planes as respectively defined by the associated cube axes.

19. The retrodirective reflector set forth in claim 18, wherein said first reflector element is the mirror image of said second reflector element, and said third reflector element is the mirror image of said fourth reflector element.

20. The retrodirective reflector set forth in claim 18, wherein said first and third planes are substantially parallel, and wherein said second and fourth planes are substantially parallel.

21. The retrodirective reflector set forth in claim 18, wherein said one edges of said first and second reflector elements lie in a common plane, and said one edges of said third and fourth reflector elements lie in a common plane.

22. The retrodirective reflector set forth in claim 18, wherein said third angle is substantially equal to said first angle but bears an opposite sign, and said fourth angle is substantially equal to said second angle but bears an opposite sign.

23. The retrodirective reflector set forth in claim 18, wherein said one edges of said first and fourth reflector elements are not parallel, and said one edges of said second and third reflector elements are not parallel.

24. The retrodirective reflector set forth in claim 18, wherein said third reflector element is rotated 180° with respect to said first reflector element, and said fourth reflector element is rotated 180° with respect to said second reflector element.

25. The retrodirective reflector set forth in claim 18, wherein said first reflector element is the mirror image of said fourth reflector element, and said third reflector element is the mirror image of said second reflector element.

26. The retrodirective reflector set forth in claim 18, wherein said given side of said first reflector element is in common with said given side of said second reflector element so as to provide a rectilinear boundary between said first and second reflector elements, and said given side of said third reflector element is in common with said given side of said fourth reflector element so as to provide a rectilinear boundary between said third and fourth reflector elements.

27. The retrodirective reflector set forth in claim 18, wherein said unit is substantially square in outline when projected in a plane perpendicular to the associated element axes, and each of said reflector elements is substantially square in outline when projected in a plane perpendicular to the associated element axis.

28. A retrodirective reflector for reflecting light substantially back to the source thereof over a wide angle, said reflector comprising a body of transparent material having a light-receiving front face, and a plurality of retrodirective cube-corner reflector elements at the rear of said body, each of said reflector elements having an element axis and a cube axis, each of said reflector elements having a substantially rectangular outline when projected in a plane perpendicular to said element axis, each of said reflector elements having three mutually perpendicular faces symmetrically arranged with respect to said cube axis and respectively intersecting in three mutually perpendicular edges, each of said reflector elements having one of said edges thereof terminating at a corner of the associated outline, the element axes respectively of all of said reflector elements being disposed substantially parallel to one another, said reflector elements being arranged into rectangular units each having four reflector elements respectively situated in the four quadrants of a rectangle, the cube axes of said first and second and third and fourth reflector elements in each unit being inclined with respect to the associated element axes respectively at first and second and third and fourth angles as measured respectively in first and second and third and fourth planes, said first and second and third and fourth reflector elements being capable of reflecting light back toward the source thereof respectively within first and second and third and fourth zones of reflectorization respectively in said first and second and third and fourth planes as respectively defined by the associated axes.

29. The retrodirective reflector set forth in claim 28, wherein said first and third planes are substantially coplanar, and said second and fourth planes are substantially coplanar.

30. The retrodirective reflector set forth in claim 28, wherein said third angle is substantially equal to said first angle but bears an opposite sign, and said fourth angle is substantially equal to said second angle but bears an opposite sign.

31. The retrodirective reflector set forth in claim 28, wherein said unit is substantially square in outline when projected in a plane perpendicular to the associated element axes, and each of said reflector elements is substantially square in outline when projected in a plane perpendicular to the associated element axis.

32. The retrodirective reflector set forth in claim 28, wherein said one edges of said unit extend respectively to the corners thereof.

33. A retrodirective reflector for reflecting light substantially back to the source thereof, said reflector comprising a body of transparent material having a light-receiving front face, and a plurality of retrodirective cube-corner reflector elements at the rear of said body, each of said reflector elements having an element axis and a cube axis, each of said reflector elements having three mutually perpendicular faces symmetrically arranged with respect to said cube axis and respectively intersecting in three mutually perpendicular edges, the element axes respectively of all of said reflector elements being disposed substantially parallel to one another, the cube axes of at least some of said reflector elements being inclined with respect to the associated element axes at a predetermined angle other than 0°, said reflector being made by: (1) providing a pin bundle comprising a plurality of pins each including an elongated shank and a cube-corner formation at one end thereof, said elongated shank being of polygon outline and having a longitudinally extending pin axis, said cube-corner formation having a cube axis at an angle to said pin axis of other than zero degrees, said cube-corner formation having three mutually perpendicular faces symmetrically arranged with respect to the cube axis of said pin and respectively intersecting in three mutually perpendicular edges, the pin axes respectively of said pins being disposed substantially parallel to one another, and (2) forming said reflector directly or indirectly against said mold, whereby the element axes of said reflector are respectively aligned with the pin axes of said pin bundle, and the cube axes of the reflector elements of said reflector are respectively aligned with the cube axes of the cube-corner formations of said pin bundle.

34. The reflector of claim 33, wherein a mold is formed against said pin bundle and said reflector is formed against said mold.

* * * * *

UNITED STATES PATENT OFFICE
CERTIFICATE OF CORRECTION

PATENT NO. : 3,923,378

DATED : December 2, 1975

INVENTOR(S) : Sidney A. Heenan

It is certified that error appears in the above-identified patent and that said Letters Patent are hereby corrected as shown below:

Column 1, line 38, after "is" insert --"--;
line 38, after "parallel" insert --"--;
line 42, insert --"-- before "more";
line 42, after "parallel" insert --"--;
line 45, after "face" insert --"--;
line 45, after "parallel" insert --"--;
line 62, after "by" insert --"--;
line 62, after "shadowing" insert --"--;
line 62, before "slippage" insert --"--;
line 62, after "slippage" insert --"--.
Column 2, line 29, "of" second occurrence should be --in--;
line 33, "elements" should be --element--.
Column 3, line 37, after "view" insert --in--.
Column 5, line 11, before "cube" insert --"--;
line 11, after "cube" insert --"--.
Column 7, line 45, after "of" insert --"--;
line 45, after "slippage" insert --"--;
line 45, after "resultant" insert --"--;
line 46, after "ing" insert --"--.
Column 8, line 4, "tube-corner" should be --cube-corner--.
Column 9, line 12, after "Of" delete "the".
Column 11, line 8, "venicne" should be --venience--.
Column 12, line 17, after "zone" insert --of--;
line 31, after "of" insert --"--;
line 31, after "slippage" insert --"--;
line 31, after "resultant" insert --"--;
line 31, after "shadowing" insert --"--;
line 38, after "no" insert --"--;
line 38, after "slippage" insert --"--.
Column 15, line 37, after "of" insert --"--;
line 37, after "slippage" insert --"--;
line 37, after "resultant" insert --"--;
line 37, after "shadowing" insert --"--;
line 44, after "no" insert --"--;
line 44, after "slippage" insert --"--.

Signed and Sealed this

Seventeenth Day of August 1976

[SEAL]

Attest:

RUTH C. MASON
Attesting Officer

C. MARSHALL DANN
Commissioner of Patents and Trademarks